United States Patent
Day et al.

(10) Patent No.: US 11,287,579 B2
(45) Date of Patent: Mar. 29, 2022

(54) NON-RIGID BLIND MATE CONNECTOR SYSTEM

(71) Applicant: Lockheed Martin Corporation, Bethesda, MD (US)

(72) Inventors: Travis E. Day, Arvada, CO (US); Kurt M. Chankaya, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/841,102

(22) Filed: Apr. 6, 2020

(65) Prior Publication Data

US 2021/0311263 A1  Oct. 7, 2021

(51) Int. Cl.
*G02B 6/38* (2006.01)
*H01R 13/62* (2006.01)
*G02B 6/35* (2006.01)
*H01R 11/30* (2006.01)

(52) U.S. Cl.
CPC ......... *G02B 6/3817* (2013.01); *G02B 6/3572* (2013.01); *G02B 6/3886* (2013.01); *H01R 11/30* (2013.01); *H01R 13/6205* (2013.01)

(58) Field of Classification Search
CPC ... G02B 6/3817; G02B 6/3572; G02B 6/3886
See application file for complete search history.

(56) References Cited

U.S. PATENT DOCUMENTS

| | | | |
|---|---|---|---|
| 3,144,527 A | 8/1964 | Tolegian | |
| 3,786,391 A | 1/1974 | Mathauser | |
| 3,808,577 A | 4/1974 | Mathauser | |
| 3,810,258 A | 5/1974 | Mathauser | |
| 3,816,679 A | 6/1974 | Hotchkiss | |
| 4,025,964 A | 5/1977 | Owens | |
| 4,641,915 A | 2/1987 | Asakawa et al. | |
| 4,690,495 A | 9/1987 | Giannini | |
| 4,844,582 A * | 7/1989 | Giannini | G02B 6/3817 385/57 |
| 5,007,697 A | 4/1991 | Chadha | |
| 5,015,061 A * | 5/1991 | Giannini | G02B 6/3817 385/56 |
| 5,295,212 A | 3/1994 | Morton et al. | |
| 7,509,000 B2 | 3/2009 | Coronado | |
| 8,398,409 B2 | 3/2013 | Schmidt | |

(Continued)

FOREIGN PATENT DOCUMENTS

DE  10206349 A1  8/2002
GB  2 020 055 B  11/1979

(Continued)

*Primary Examiner* — Sung H Pak (74) *Attorney, Agent, or Firm* — Baker Botts L.L.P.

(57) ABSTRACT

In one embodiment, an apparatus includes a first connector portion and a second connector portion. The first connector portion includes a first magnet, an electrical pin, and a first fiber optic connector. The second connector portion is configured to form a non-rigid connection to the first connector portion. The second connector portion includes a second magnet configured to mate with the first magnet of the first connector portion, an electrical contact configured to mate with the electrical pin of the first connector portion, and a second fiber optic connector configured to mate with the first fiber optic connector of the first connector portion.

20 Claims, 10 Drawing Sheets

(56) References Cited

U.S. PATENT DOCUMENTS

| | | | |
|---|---|---|---|
| 8,774,577 B2 | 7/2014 | Benjamin et al. | |
| 9,829,655 B2 | 11/2017 | Erdman et al. | |
| 10,082,631 B2* | 9/2018 | Lee | G02B 6/3886 |
| 2014/0120746 A1 | 5/2014 | Persion et al. | |
| 2017/0031110 A1* | 2/2017 | Bhagavatula | G02B 6/3886 |
| 2017/0184801 A1 | 6/2017 | Isenhour et al. | |

FOREIGN PATENT DOCUMENTS

| | | | |
|---|---|---|---|
| JP | 61228407 A | 10/1986 | |
| JP | 11304399 A | 11/1999 | |

* cited by examiner

SECTION A-A

SECTION B-B
FIG. 6B

NON-RIGID BLIND MATE CONNECTOR SYSTEM

TECHNICAL FIELD

This disclosure generally relates to connectors and more specifically to a non-rigid blind mate connector system.

BACKGROUND

Many devices rely on physical connectors for power and data communications. For example, missiles are usually communicatively connected to an aircraft via umbilical connectors. These connectors are typically rigid connectors where metal pins of one connector penetrate receptacles in a mating connector. These typical connectors are usually difficult to align within compact missile bays, provide slow data rates which add to launch delays, and have high connector damage rates that are caused by bad disconnects at launch.

SUMMARY OF PARTICULAR EMBODIMENTS

In one embodiment, a connector system includes a first connector and a second connector. The first connector includes a first plurality of magnets, a plurality of ball bearings, a plurality of electrical push pins, and a first fiber optic connector. The second connector is configured to form a non-rigid connection to the first connector. The second connector includes a second plurality of magnets configured to mate with the first plurality of magnets of the first connector, a plurality of ball bearing apertures configured to mate with the ball bearings of the first connector, and a plurality of dowel pins, each dowel pin being located adjacent to one of the plurality of ball bearing apertures. The second connector further includes a plurality of electrical contacts configured to mate with the plurality of electrical push pins of the first connector and a second fiber optic connector configured to mate with the first fiber optic connector of the first connector.

In another embodiment, a connector system includes a first connector and a second connector. The first connector includes a first magnet, a ball bearing, an electrical pin, and a first fiber optic connector. The second connector is configured to form a non-rigid connection to the first connector. The second connector includes a second magnet configured to mate with the first magnet of the first connector, a ball bearing aperture configured to mate with the ball bearing of the first connector, an electrical contact configured to mate with the electrical pin of the first connector, and a second fiber optic connector configured to mate with the first fiber optic connector of the first connector.

In another embodiment, an apparatus includes a first connector portion and a second connector portion. The first connector portion includes a first magnet, an electrical pin, and a first fiber optic connector. The second connector portion is configured to form a non-rigid connection to the first connector portion. The second connector portion includes a second magnet configured to mate with the first magnet of the first connector portion, an electrical contact configured to mate with the electrical pin of the first connector portion, and a second fiber optic connector configured to mate with the first fiber optic connector of the first connector portion.

The present disclosure provides numerous technical advantages over typical connector systems. As one example, the disclosed connectors provide a blind mate connection system that eliminates umbilical connectors that are used on many missile systems. This reduces or eliminates damage from loose umbilical connectors of existing systems. As another example, some disclosed connectors utilize push-pin or banana plug pins for electrical connections between mating connectors instead of typical connectors that utilize pins that penetrate embedded connectors. This enables a non-rigid connection with controlled free play between connectors, thereby reducing or eliminating connector damage due to bad disconnects of typical systems at missile launch. Furthermore, some embodiments utilize non-penetrating fiber optic connections for data communications between missile and aircraft. This further enables a non-rigid connection between connectors, increases the data communication speed over existing electrical communications, and provides protection from electromagnetic interference (EMI).

Other technical advantages will be readily apparent to one skilled in the art from the following figures, descriptions, and claims. Moreover, while specific advantages have been enumerated herein, various embodiments may include all, some, or none of the enumerated advantages.

DESCRIPTION OF EXAMPLE EMBODIMENTS

Many devices rely on physical connectors for power and data communications. For example, missiles are usually communicatively connected to an aircraft via umbilical connectors. These connectors are typically rigid connectors where metal pins of one connector penetrate receptacles in a mating connector. These typical connectors are usually difficult to align within compact missile bays, provide slow data rates which add to launch delays, and have high connector damage rates that are caused by bad disconnects at launch.

To address these and other problems with typical connector systems, the disclosed embodiments provide a blind mate connector system that eliminates umbilical connectors that are used on many missile systems. This reduces or eliminates damage from loose connectors of existing systems. In some embodiments, the disclosed connectors utilize push-pin or banana plug pins for power connections between mating connectors instead of typical connectors that utilize pins that penetrate embedded connectors. This enables a non-rigid connection with controlled free play between connectors, thereby reducing or eliminating connector damage due to bad disconnects of typical systems at missile launch. Furthermore, some embodiments utilize non-penetrating fiber optic connections for data communications between missile and aircraft. This further enables a non-rigid connection between connectors, increases the data communication speed over existing electrical communications, and provides protection from electromagnetic interference (EMI).

To facilitate a better understanding of the present disclosure, the following examples of certain embodiments are given. In no way should the following examples be read to limit, or define, the scope of the disclosure. Embodiments of the present disclosure and its advantages may be best understood by referring to the include FIGURES, where like numbers are used to indicate like and corresponding parts.

Figure 1A:
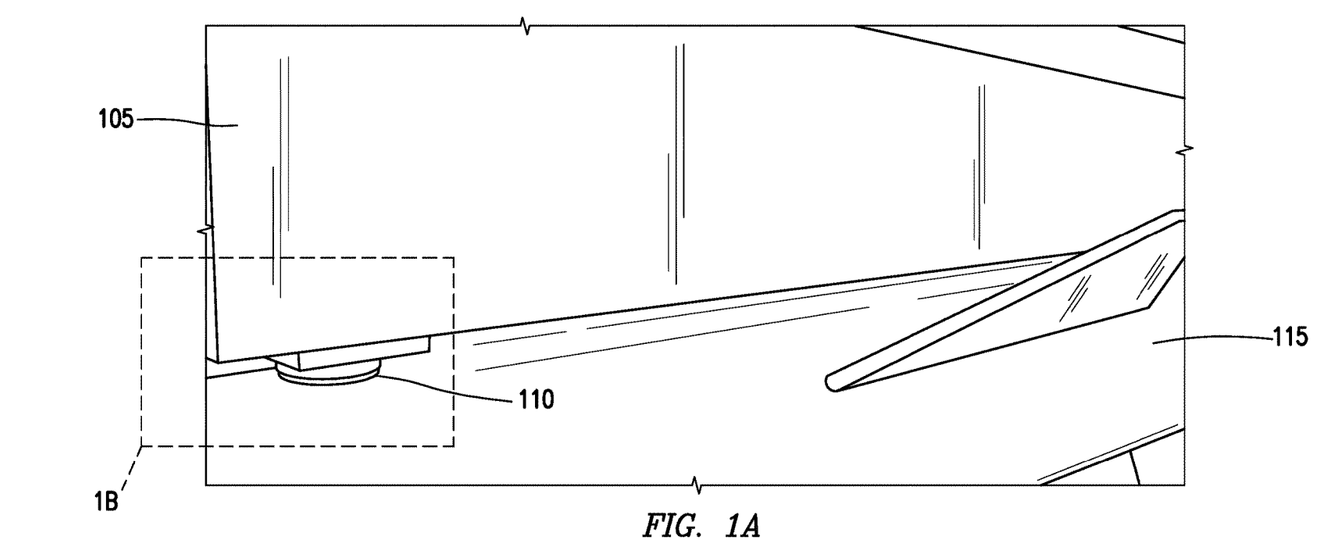
FIGS. 1A-1B illustrate an example missile ejection system that may utilize a non-rigid blind mate connector system, according to certain embodiments.
Figure 1B:
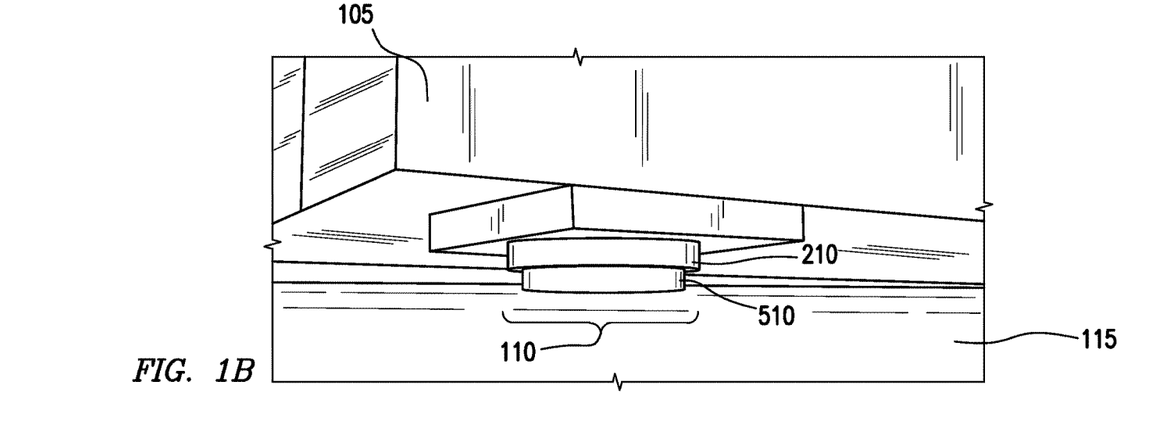

FIGS. 1A-1B illustrate an example missile ejection system 100 that may utilize a non-rigid blind mate connector system 110, according to certain embodiments. Missile ejection system 100 includes a missile ejection rack 105 and a missile 115 that is communicatively connected to missile ejection rack 105 via non-rigid blind mate connector system 110. While particular embodiments of non-rigid blind mate connector system 110 are described herein as being utilized by missile ejection system 100, non-rigid blind mate connector system 110 may be utilized by any other non-missile system (e.g., pilot headsets, etc.).

In general, non-rigid blind mate connector system 110 provides an improved method of connecting missile 115 to missile ejection rack 105. Typically, missile 115 includes an umbilical connector that is connected to missile ejection rack 105. Such umbilical connectors are difficult to align within compact missile bays and are prone to damaging components on either missile 115 or missile ejection rack 105 when missile 115 is launched. Non-rigid blind mate connector system 110, on the other hand, is self-aligning and reduces or eliminates damage from loose umbilical connectors of existing systems. Furthermore, typical connectors such as umbilical connectors provide rigid connections using metal connectors that are pushed into and become embedded within receptacles of the mating connector. Such rigid connections are sometimes damaged upon missile launch, and such rigid connections are not ideal for fiber optic communications. The disclosed embodiments, however, are non-rigid (i.e., there is some amount of controlled free play between mating connectors). For example, some embodiments utilize magnets for alignment and push-pin or banana plug pins for electrical connections between mating connectors instead of typical connectors that utilize pins that penetrate embedded connectors. This enables a non-rigid connection with controlled free play between connectors, thereby reducing or eliminating connector damage due to bad disconnects of typical systems at missile launch. Furthermore, some embodiments utilize non-penetrating fiber optic connections for data communications between missile and aircraft. This further enables a non-rigid connection between connectors, increases the data communication speed over existing electrical communications, and provides protection from electromagnetic interference (EMI).

Figure 2A:
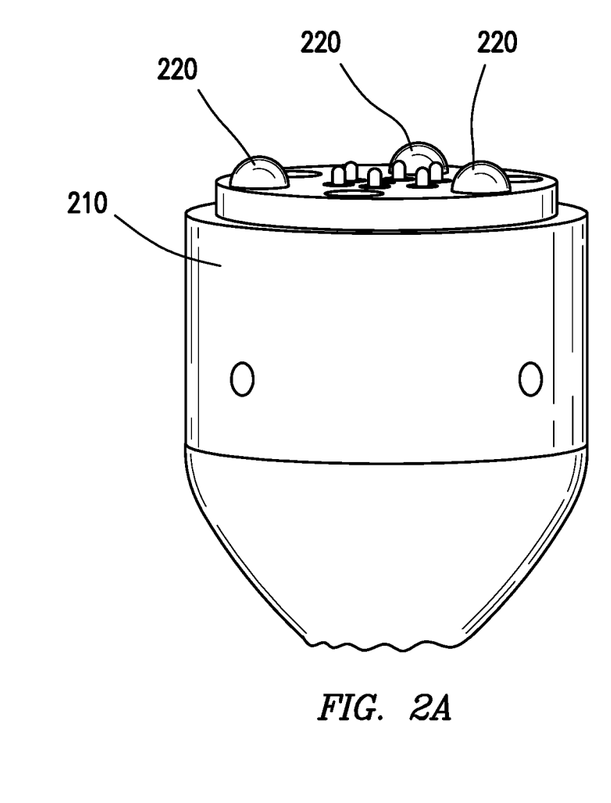
FIGS. 2A-2B illustrate an example rack-side connector of the non-rigid blind mate connector system of FIG. 1, according to certain embodiments.
Figure 2B:
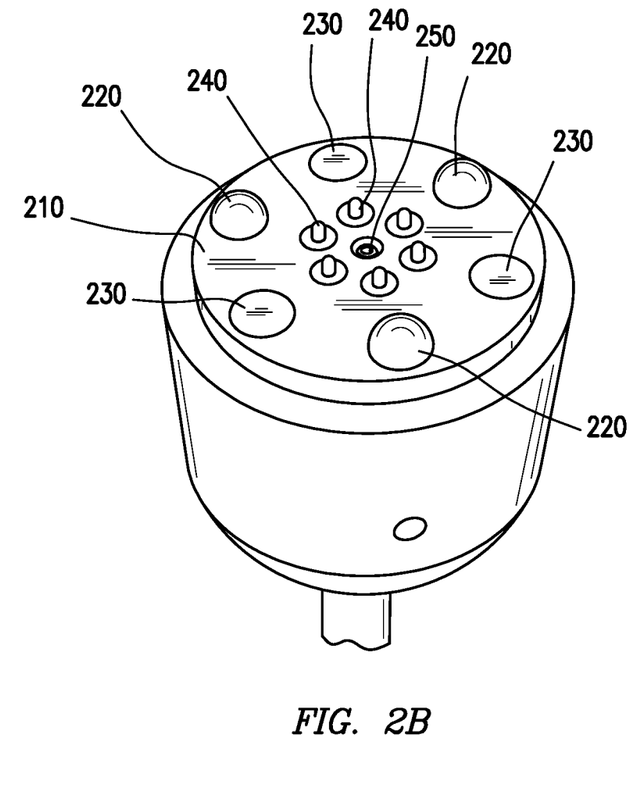
Figure 3A:
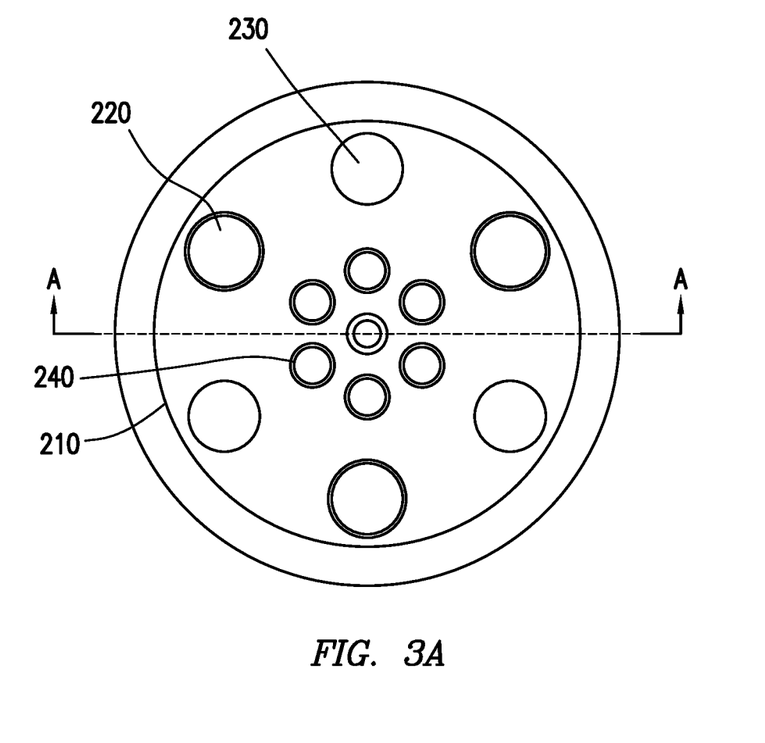
FIGS. 3A-3B illustrate various views of the rack-side connector of FIGS. 2A-2B, according to certain embodiments.
Figure 3B:
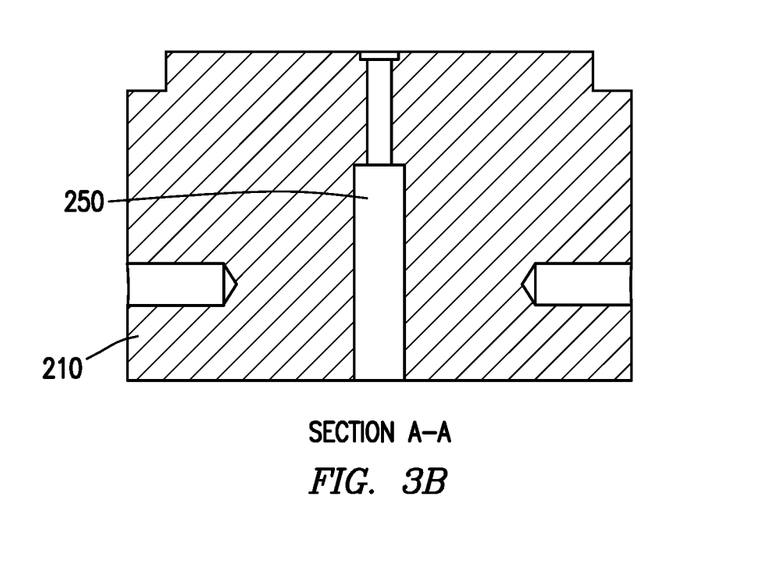
Figure 4:
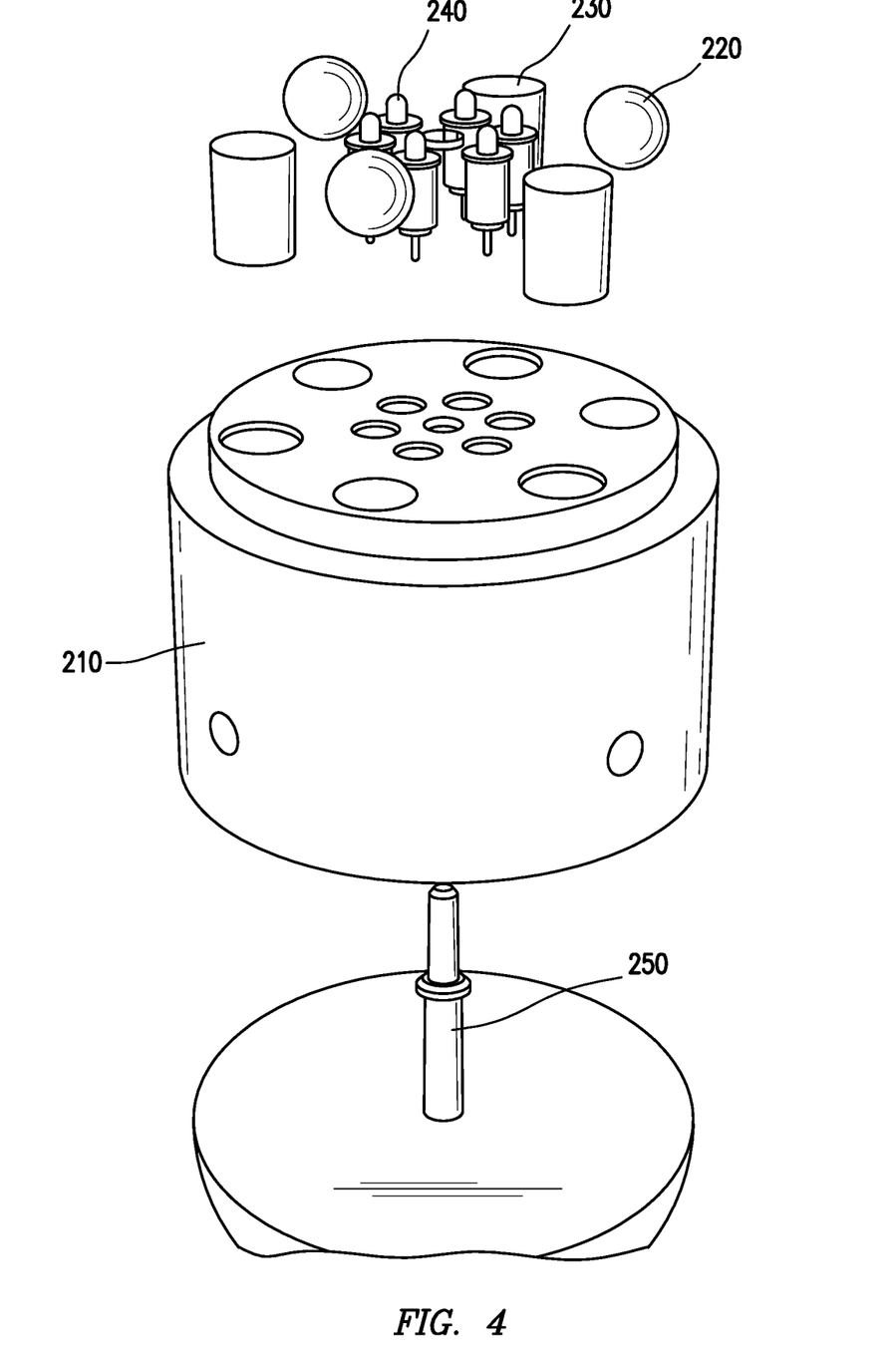
FIG. 4 illustrates an exploded view of the rack-side connector of FIGS. 2A-2B, according to certain embodiments.

FIGS. 2A-2B illustrate an example rack-side connector 210 of non-rigid blind mate connector system 110 of FIG. 1, according to certain embodiments. FIGS. 3A-3B illustrate top and side views of rack-side connector 210, respectively, and FIG. 4 illustrates an exploded view of rack-side connector 210. In some embodiments, rack-side connector 210 includes one or more ball bearings 220, one or more magnets 230, one or more electrical pins 240, and a fiber optic connector 250. In some embodiments, as illustrated in the include figures, rack-side connector 210 includes three ball bearings 220, three magnets 230, six electrical pins 240, and one fiber optic connector 250 in a particular arrangement as illustrated. In other embodiments, however, rack-side connector 210 may have more or fewer of these components and may be configured in any appropriate arrangement or configuration. In addition, while rack-side connector 210 is described as being attached to missile ejection rack 105, rack-side connector 210 may in some embodiments be connected to missile 115 instead of missile ejection rack 105 (i.e., rack-side connector 210 and missile-side connector 510 are interchangeable).

In some embodiments, rack-side connector 210 includes one or more ball bearings 220 (e.g., three ball bearings 220 in some embodiments). In general, ball bearings 220 align with and are inserted partially within ball bearing apertures 530 during connector mating. Ball bearings 220 help align rack-side connector 210 with missile-side connector 510 but permit some free play between rack-side connector 210 and missile-side connector 510. In some embodiments, ball bearings 220 are spheres that are embedded at least partially within rack-side connector 210 (e.g., embedded half way in rack-side connector 210). In some embodiments, ball bearings 220 are made of metal (e.g., steel and the like). In some embodiments, ball bearings 220 are high tolerance bearings (e.g., ±0.0001"). In some embodiments, ball bearings 220 are spaced 120° apart as illustrated in FIG. 3A.

Figure 8A:
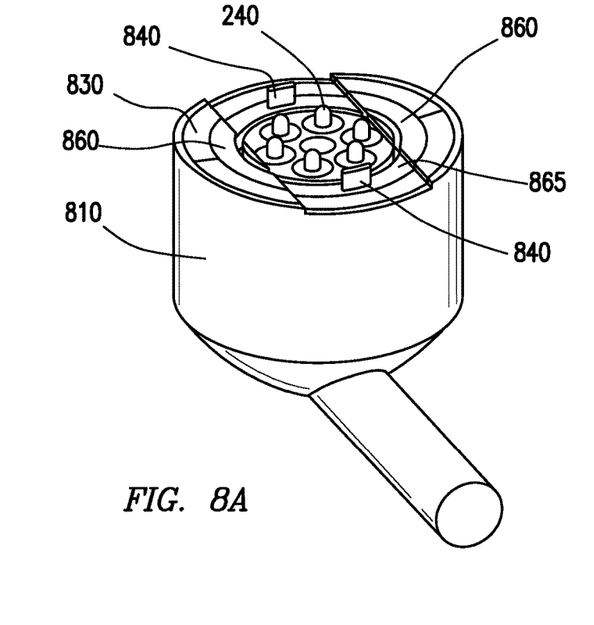
FIG. 8A illustrates another embodiment of a rack-side connector of the non-rigid blind mate connector system of FIG. 1, according to certain embodiments.
Figure 8B:
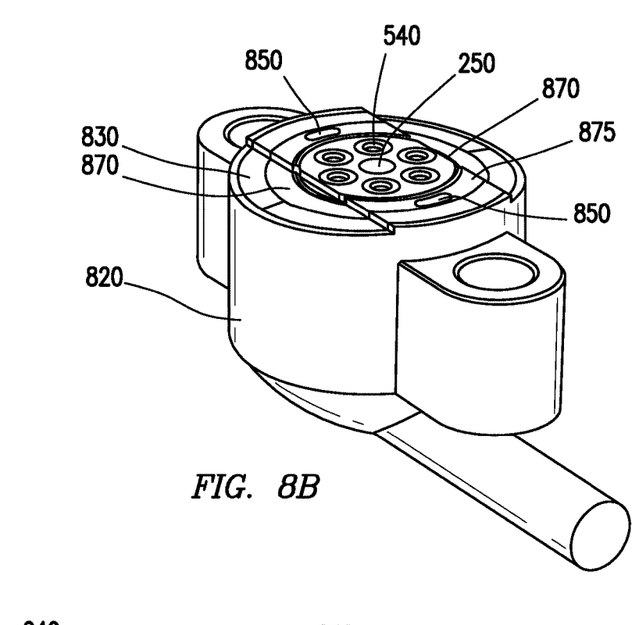
FIG. 8B illustrates another embodiment of a missile-side connector of the non-rigid blind mate connector system of FIG. 1, according to certain embodiments.

In some embodiments, rack-side connector 210 and missile-side connector 510 each includes one or more magnets 230 (e.g., three magnets 230 in some embodiments). In general, magnets 230 of rack-side connector 210 align with magnets 230 of missile-side connector 510 during connector mating. Magnets 230 help align and connect rack-side connector 210 with missile-side connector 510 but permit some free play between rack-side connector 210 and missile-side connector 510. In some embodiments, magnets 230 are cylinders that are embedded within rack-side connector 210 and missile-side connector 510 so that they are flush. In some embodiments, magnets 230 are ring magnets as illustrated in FIGS. 8A-8B. In some embodiments, magnets 230 are rare-earth Nd magnets that provide at least 3 lb. of pull per magnet (at least 9 lb. total pull in embodiments with three magnets 230). In some embodiments, magnets 230 are spaced 120° apart as illustrated in FIG. 3A.

In some embodiments, rack-side connector 210 includes one or more electrical pins 240 (e.g., six electrical pins 240 in some embodiments). In general, electrical pins 240 align with electrical contacts 540 during connector mating in order to provide electrical power and electrical communications to missile 115. Unlike typical missile umbilical connectors where electrical contacts from one connector are pushed into and embedded within a mating connector, electrical pins 240 only contact electrical contacts 540 in some embodiments (i.e., they are not embedded within electrical contacts 540). This permits some free play between rack-side connector 210 and missile-side connector 510. In some embodiments, electrical pins 240 are electrical push pins. In some embodiments, electrical pins 240 are banana plug pins. In some embodiments, electrical pins 240 are spaced 60° apart as illustrated in FIG. 3A.

In some embodiments, rack-side connector 210 and missile-side connector 510 each includes a fiber optic connector 250. In general, fiber optic connector 250 of rack-side connector 210 aligns with fiber optic connector 250 of missile-side connector 510 during connector mating in order to provide fiber optic communications with missile 115. Fiber optic connector 250 provides numerous benefits over existing electrical communications to missile 115 such as increased data communications speed and EMI resistance. In some embodiments, fiber optic connectors 250 are located in the centers of rack-side connector 210 and missile-side connector 510 as illustrated in FIG. 3A. In some embodiments, fiber optic connectors 250 are expanded beam fiber optic termini with no springs or moving parts. In some embodiments, fiber optic connectors 250 are 16-gauge termini (1.3 mm diameter). Expanded beam fiber connectors increase the diameter of the laser beam, thereby reducing the effects of dust, dirt, and debris that may be between fiber optic connectors 250.

Figure 5A:
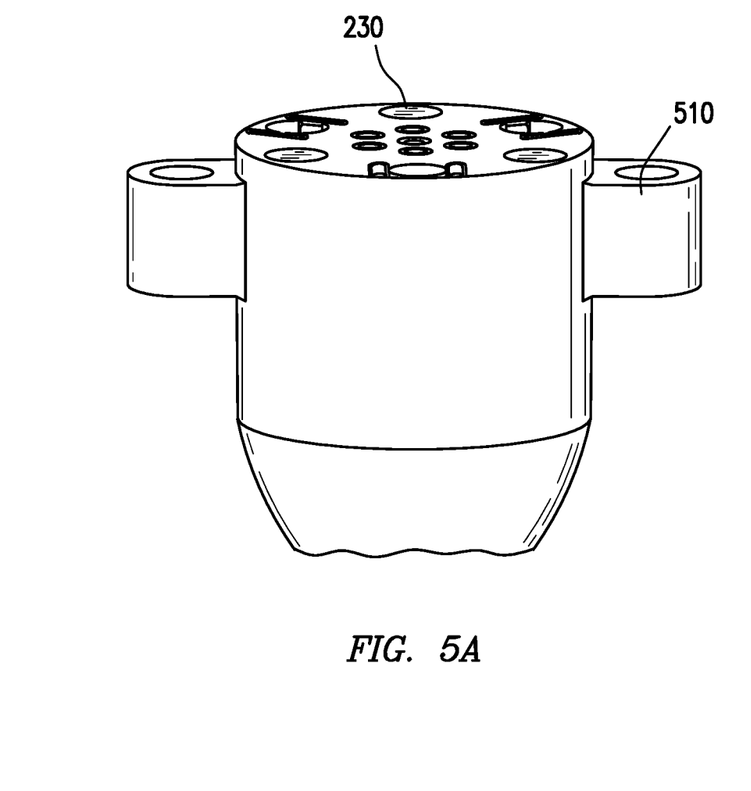
FIGS. 5A-5B illustrate an example missile-side connector of the non-rigid blind mate connector system of FIG. 1, according to certain embodiments.
Figure 5B:
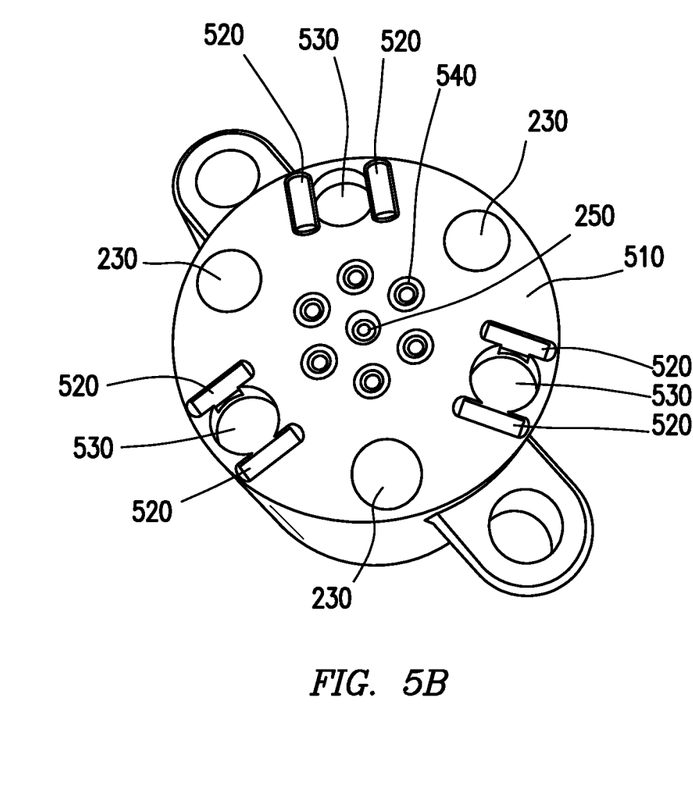
Figure 6A:
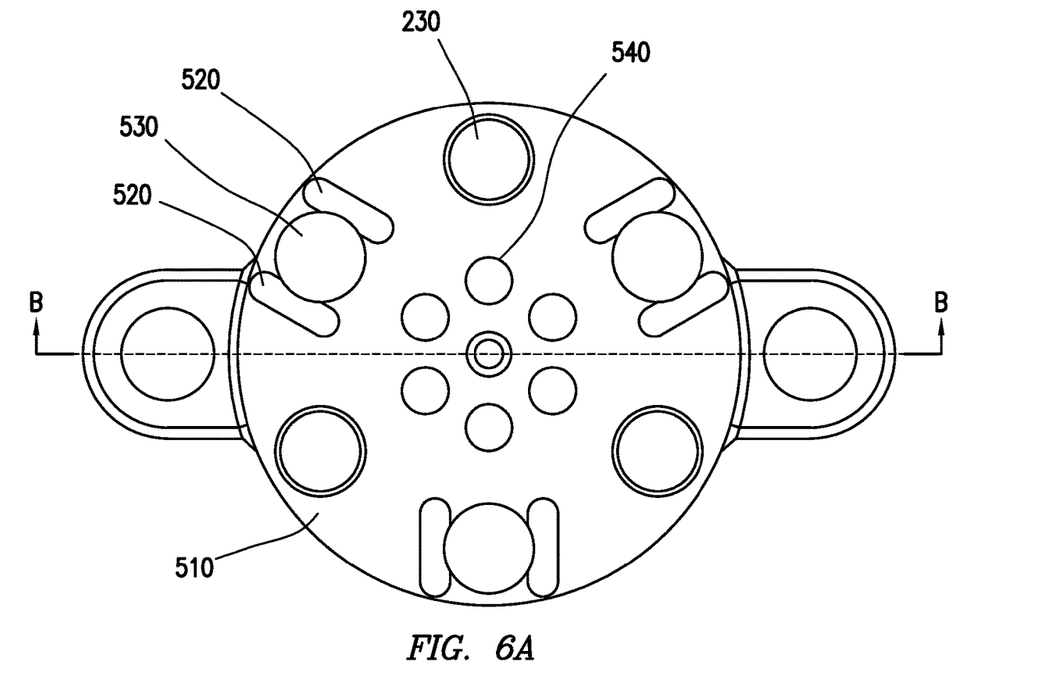
FIGS. 6A-6B illustrate various views of the missile-side connector of FIGS. 5A-5B, according to certain embodiments.
Figure 6B:
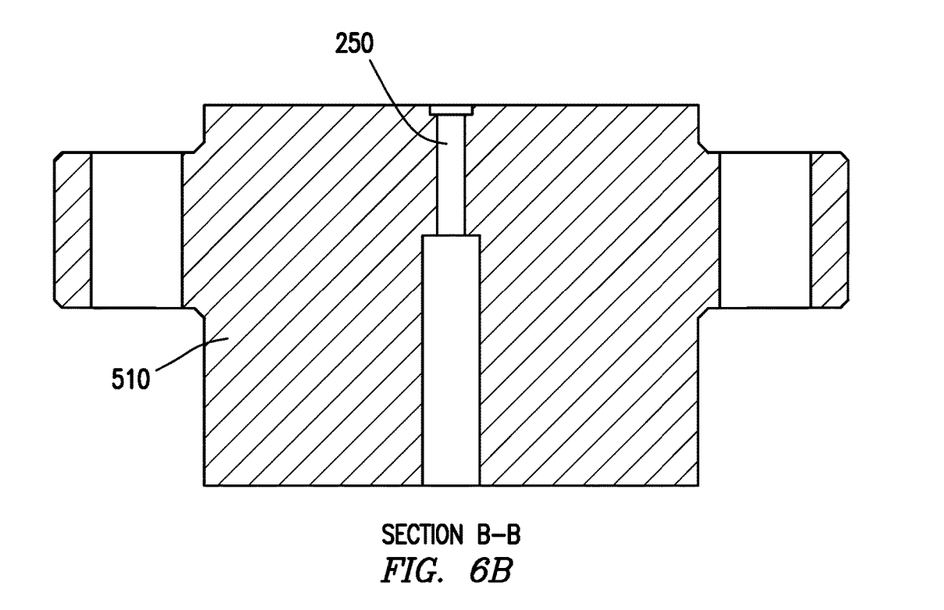
Figure 7:
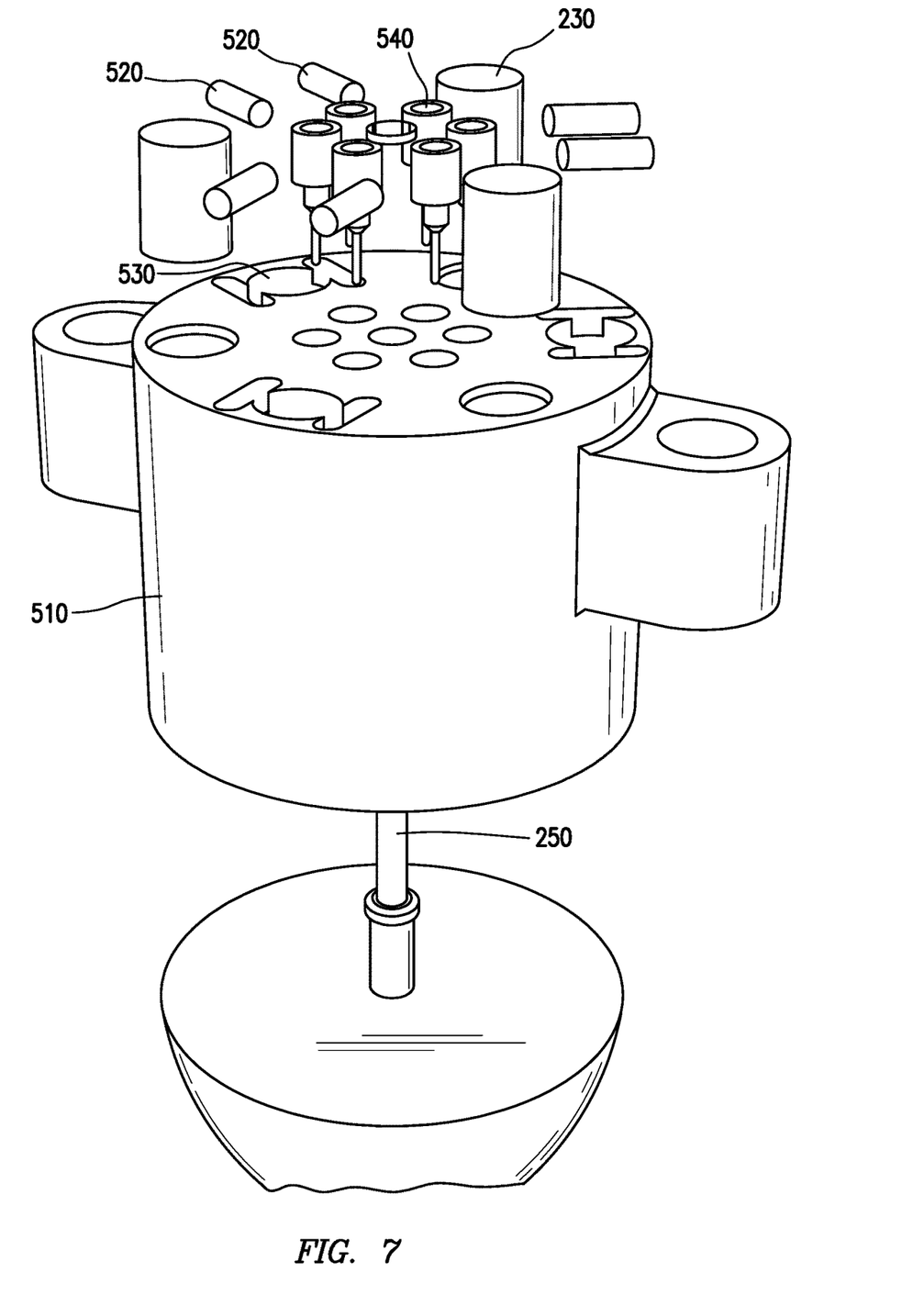
FIG. 7 illustrates an exploded view of the missile-side connector of FIGS. 5A-5B, according to certain embodiments.

FIGS. 5A-5B illustrate an example missile-side connector 510 of non-rigid blind mate connector system 110 of FIG. 1, according to certain embodiments. FIGS. 6A-6B illustrate top and side views of missile-side connector 510, respectively, and FIG. 7 illustrates an exploded view of missile-side connector 510. In some embodiments, missile-side connector 510 includes one or more dowel pins 520, one or more ball bearing apertures 530, one or more magnets 230, one or more electrical contacts 540, and a fiber optic connector 250. In some embodiments as illustrated in the include figures, missile-side connector 510 includes three ball bearing apertures 530, two dowel pins 520 for each ball bearing aperture 530, three magnets 230, six electrical contacts 540, and one fiber optic connector 250 in a particular arrangement as illustrated. In other embodiments, however, missile-side connector 510 may have more or fewer of these components and may be configured in any appropriate arrangement or configuration. In addition, while missile-side connector 510 is described as being attached to missile 115, missile-side connector 510 may in some embodiments be connected to missile ejection rack 105 instead of missile 115 (i.e., rack-side connector 210 and missile-side connector 510 are interchangeable).

In some embodiments, missile-side connector 510 includes one or more ball bearing apertures 530 (e.g., three ball bearing apertures 530 in some embodiments). In general, ball bearings 220 of rack-side connector 210 align with and are inserted partially within ball bearing apertures 530 of missile-side connector 510 during connector mating. In some embodiments, ball bearing apertures 530 are cylindrical holes that permit spherical ball bearings 220 to be embedded at least partially within ball bearing apertures 530. In some embodiments, ball bearing apertures 530 are spaced 120° apart as illustrated in FIG. 6A.

In some embodiments, missile-side connector 510 includes one or more dowel pins 520 (e.g., two dowel pins 520 per ball bearing aperture 530 in some embodiments). In general, dowel pins 520 help non-rigid blind mate connector system 110 to be blind-mate and self-aligning with repeatable tolerances. For example, during connector alignment, ball bearings 220 may slide along dowel pins 520 and into ball bearing apertures 530. In some embodiments, dowel pins 520 are made of metal (e.g., steel and the like). In some embodiments, dowel pins 520 are high tolerance dowels (e.g., ±0.0002"). In some embodiments, ball bearings 220 are adjacent to ball bearing apertures 530 as illustrated in FIG. 6A.

Figure 8C:
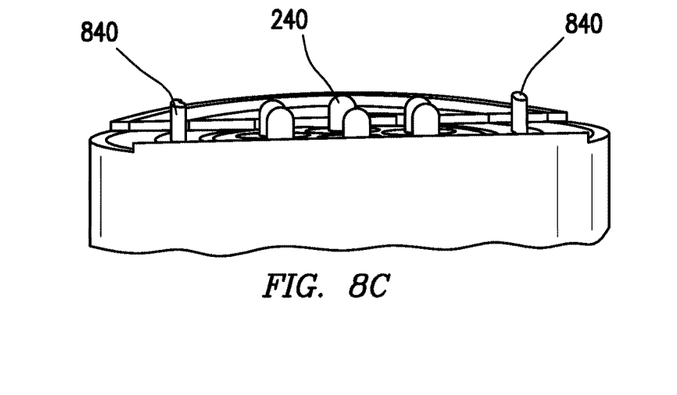
FIG. 8C illustrates another view of the rack-side connector of FIG. 8A, according to certain embodiments.
Figure 9A:
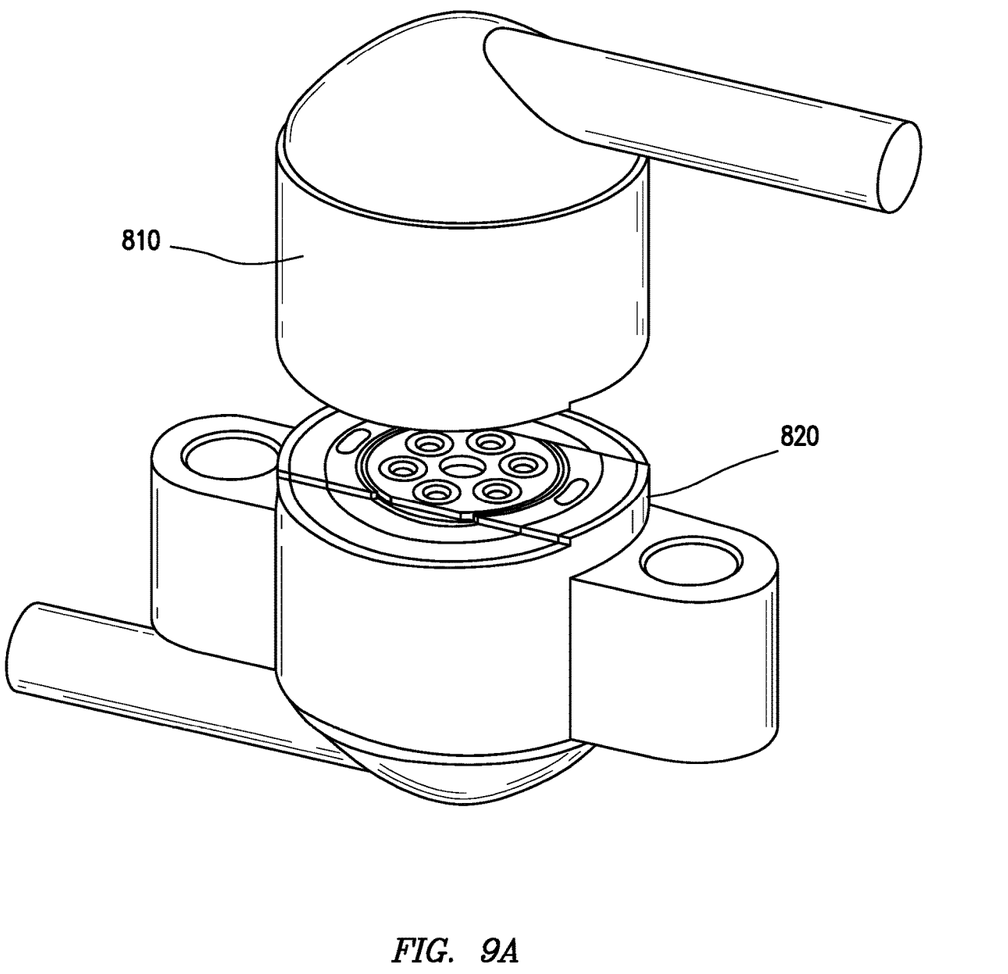
FIGS. 9A-9B illustrate the mating of the connectors of FIGS. 8A-8B, according to certain embodiments.
Figure 9B:
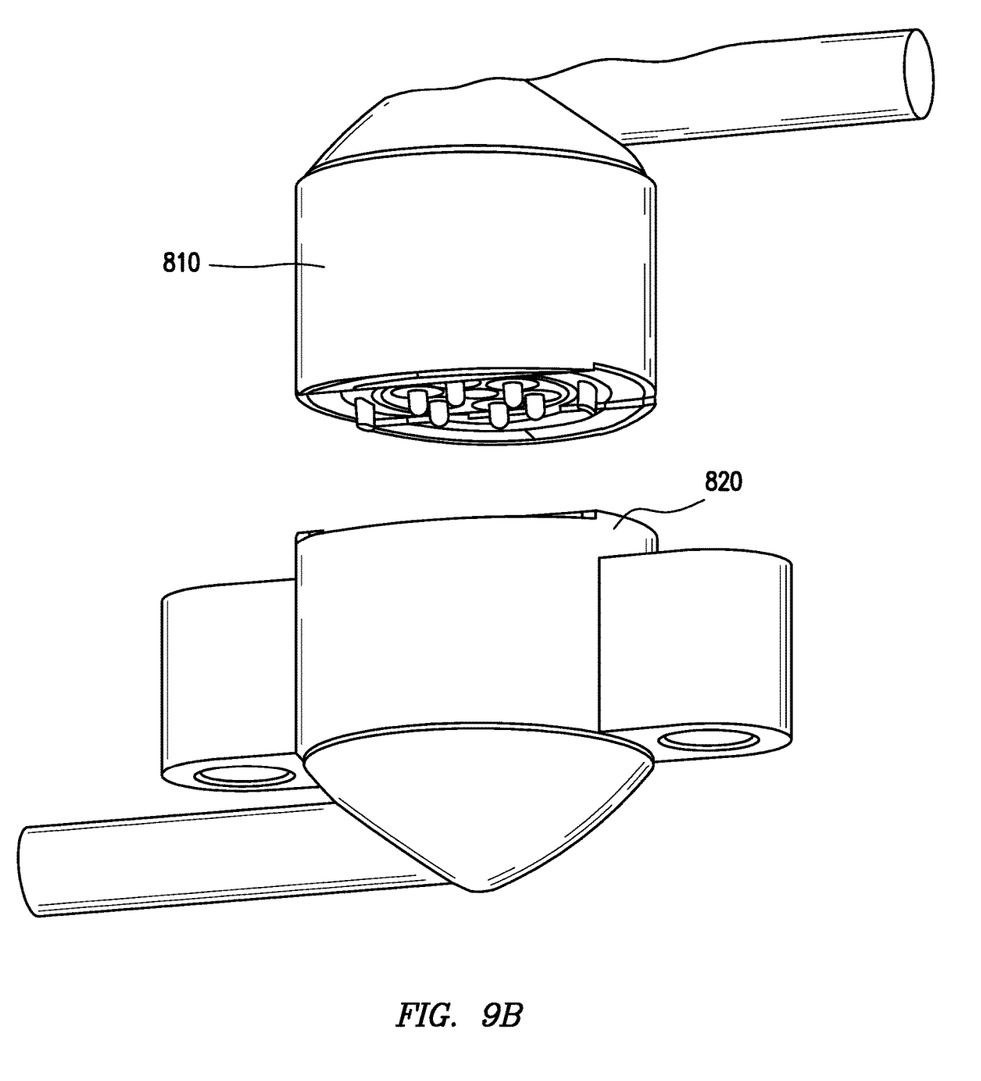

In some embodiments, rack-side connector 210 and missile-side connector 510 have flat faces as illustrated in FIGS. 2A-7. In other embodiments, rack-side connector 210 and missile-side connector 510 may have curved or slanted portions. This may allow, for example, missile-side connector 510 to match the contours of missile 115, thereby allowing missile-side connector 510 to remain flush with missile 115. This may increase the aerodynamics of missile 115. Certain embodiments of non-rigid blind mate connector system 110 with non-flat faces are illustrated in FIGS. 8A-9B. FIGS. 8A and 8C illustrate an embodiment of a rack-side connector 810 with a non-flat face, FIG. 8B illustrates an embodiment of a missile-side connector 820 with a non-flat face, and FIGS. 9A-9B illustrate the mating of the connectors of FIGS. 8A-8B, according to certain embodiments. It should be understood that rack-side connector 810 and missile-side connector 820 are interchangeable and either one can be installed on missile ejection rack 105, missile 115, or any other non-missile system.

In some embodiments, rack-side connector 210 and missile-side connector 510 each includes one or more magnets 840 (e.g., one ring magnet 840 in some embodiments). In general, magnet 840 of rack-side connector 810 aligns with magnet 840 of missile-side connector 820 during connector mating. Magnets 840 help align and connect rack-side connector 810 with missile-side connector 820 but permit some free play between rack-side connector 810 and missile-side connector 820. In some embodiments, magnets 840 are ring-shaped magnets that are embedded within rack-side connector 810 and missile-side connector 820 so that they are flush. In other embodiments, magnets 840 are the same as magnets 230 described above. In some embodiments, magnets 840 are rare-earth Nd magnets.

In some embodiments, rack-side connector 810 includes one or more protrusions 840 and missile-side connector 820 includes a matching number of protrusion apertures 850 (or vice versa). During connector mating, protrusions 840 are inserted into protrusion apertures 850. Protrusions 840 may be any shape and size and are generally configured to help align rack-side connector 810 with missile-side connector 820. In some embodiments, protrusions 840 are at least as tall as electrical pins 240 as illustrated in FIG. 8C. This may help to protect electrical pins 240 during connector mating.

As described above, rack-side connector 810 and missile-side connector 820 each have non-flat faces that may permit missile-side connector 820 to match the contour of missile 115. To achieve this, some embodiments of rack-side connector 810 include at least one key portion 860 (e.g., two key portions 860 as illustrated) and a lowered middle portion 865, and missile-side connector 820 includes at least one key hole portion 870 (e.g., two key hole portions 870 as illustrated) and a raised middle portion 875. In some embodiments, key portions 860 are slanted or curved, and key hole portions 870 have a corresponding (but opposite) shape. In some embodiments, lowered middle portion 865 and raised middle portion 875 are each flat as illustrated. These features allow missile-side connector 820 to match the contour of missile 115 while still maintaining an easy-to-use blind mate and self-aligning connector system.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A connector system, comprising:
   a first connector comprising:
      a first plurality of magnets;
      a plurality of ball bearings;
      a plurality of electrical push pins; and
      a first fiber optic connector;
   a second connector configured to form a non-rigid connection to the first connector, the non-rigid connection comprising an amount of controlled free play between the second connector and the first connector when the second connector is mated to the first connector, the non-rigid connection operable to prevent damage to the connector system when the second connector is disconnected from the first connector, the second connector comprising:
      a second plurality of magnets configured to mate with the first plurality of magnets of the first connector;
      a plurality of ball bearing apertures configured to mate with the ball bearings of the first connector;
      a plurality of dowel pins, each dowel pin being located adjacent to one of the plurality of ball bearing apertures;
      a plurality of electrical contacts configured to mate with the plurality of electrical push pins of the first connector; and
      a second fiber optic connector configured to mate with the first fiber optic connector of the first connector.

2. The connector system of claim 1, wherein:
   the first connector is configured for installation in a missile rack of an aircraft;
   the second connector is configured for installation in a missile; and
   the non-rigid connection is operable to prevent damage to the connector system when the missile is launched.

3. The connector system of claim 1, wherein the first and second fiber optic connectors each comprise an expanded beam fiber optic termini.

4. The connector system of claim 1, wherein each ball bearing aperture comprises two adjacent dowel pins.

5. The connector system of claim 1, wherein:
   the first plurality of magnets is three magnets; and
   the second plurality of magnets is three magnets.

6. The connector system of claim 1, wherein:
   the plurality of ball bearings is three ball bearings; and
   the plurality of ball bearing apertures is three ball bearing apertures.

7. The connector system of claim 1, wherein:
   the plurality of electrical push pins is six electrical push pins; and
   the plurality of electrical contacts is six electrical contacts.

8. A connector system, comprising:
   a first connector comprising:
      a first magnet;
      a ball bearing;
      an electrical pin; and
      a first fiber optic connector;
   a second connector configured to form a non-rigid connection to the first connector, the non-rigid connection comprising an amount of controlled free play between the second connector and the first connector when the second connector is mated to the first connector, the non-rigid connection operable to prevent damage to the connector system when the second connector is disconnected from the first connector, the second connector comprising:
      a second magnet configured to mate with the first magnet of the first connector;
      a ball bearing aperture configured to mate with the ball bearing of the first connector;
      an electrical contact configured to mate with the electrical pin of the first connector; and
      a second fiber optic connector configured to mate with the first fiber optic connector of the first connector.

9. The connector system of claim 8, wherein:
   the first connector is configured for installation in a missile rack of an aircraft;
   the second connector is configured for installation in a missile; and
   the non-rigid connection is operable to prevent damage to the connector system when the missile is launched.

10. The connector system of claim 8, wherein the first and second fiber optic connectors each comprise an expanded beam fiber optic termini.

11. The connector system of claim 10, wherein expanded beam fiber optic termini is a 16 gauge termini.

12. The connector system of claim 8, the second connector further comprising a plurality of dowel pins, each dowel pin being located adjacent to the ball bearing aperture.

13. The connector system of claim 8, wherein the first and second magnets are each rare-earth magnets.

14. The connector system of claim 8, wherein the electrical pin is an electrical push pin.

15. An apparatus, comprising:
   a first connector portion comprising:
      a first magnet;
      an electrical pin; and
      a first fiber optic connector;
   a second connector portion configured to form a non-rigid connection to the first connector portion, the non-rigid connection comprising an amount of controlled free play between the second connector portion and the first connector portion when the second connector portion is mated to the first connector portion, the non-rigid connection operable to prevent damage to the apparatus when the second connector portion is disconnected from the first connector portion, the second connector portion comprising:
- a second magnet configured to mate with the first magnet of the first connector portion;
- an electrical contact configured to mate with the electrical pin of the first connector portion; and
- a second fiber optic connector configured to mate with the first fiber optic connector of the first connector portion.

16. The apparatus of claim 15, wherein:
the first connector portion is configured for installation in a missile rack of an aircraft;
the second connector portion is configured for installation in a missile; and
the non-rigid connection is operable to prevent damage to the apparatus when the missile is launched.

17. The apparatus of claim 15, wherein the first and second fiber optic connectors each comprise an expanded beam fiber optic termini.

18. The apparatus of claim 17, wherein expanded beam fiber optic termini is a 16 gauge termini.

19. The apparatus of claim 15, wherein the first and second magnets are each rare-earth magnets.

20. The apparatus of claim 15, wherein the electrical pin is a banana plug pin.

* * * * *